Aug. 27, 1940.　　A. S. JOHNSON　　2,212,941
CASTING BOBBER
Filed March 18, 1940
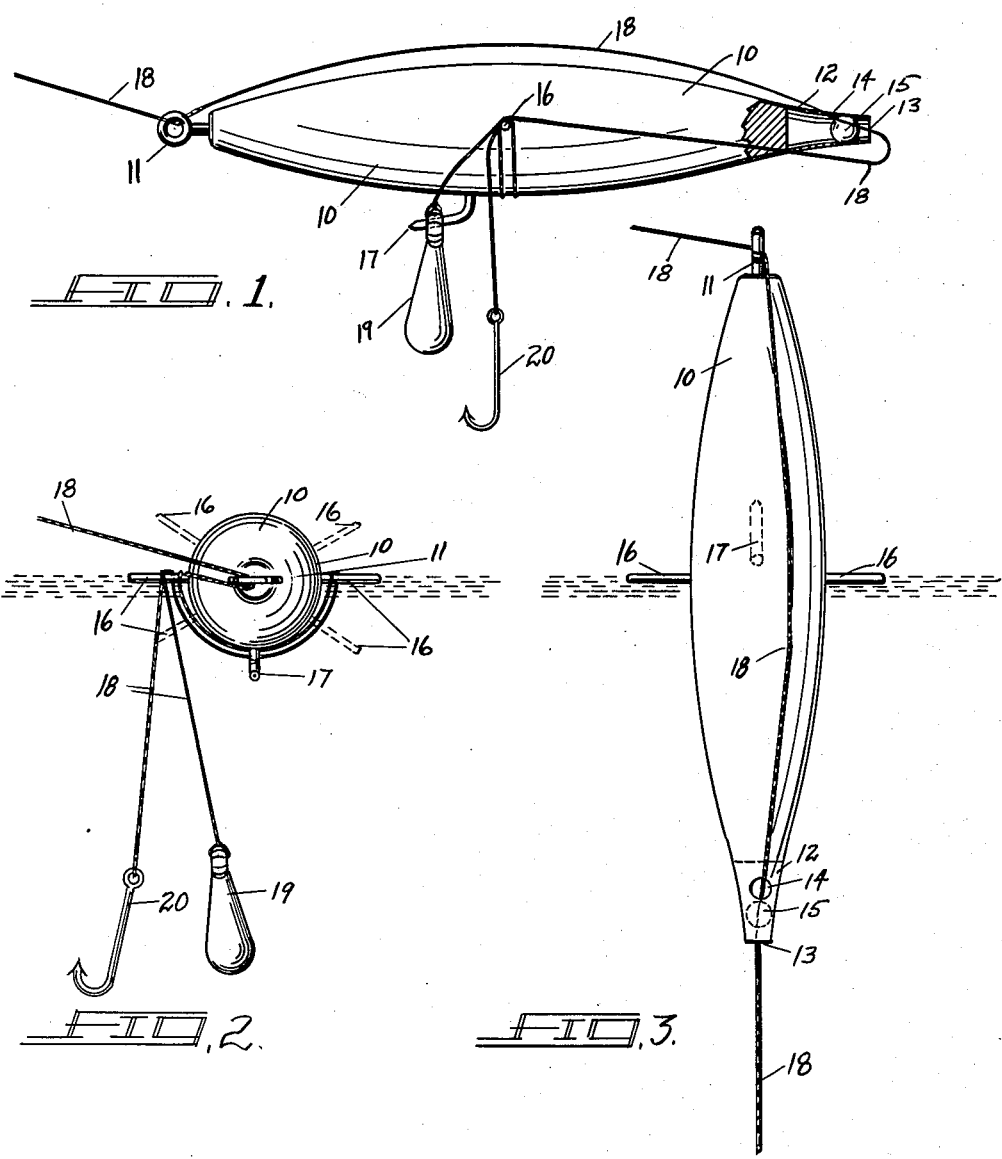
Albert S. Johnson
INVENTOR,
BY W. B. Harpman
ATTORNEY.

Patented Aug. 27, 1940

2,212,941

UNITED STATES PATENT OFFICE 2,212,941

CASTING BOBBER

Albert S. Johnson, Struthers, Ohio

Application March 18, 1940, Serial No. 324,528

2 Claims. (Cl. 43—49)

This invention relates to a fishline bobber and particularly to a bobber formed in a manner that will permit it and its associated tackle to be cast a considerable distance without following the tackle or presenting any problem in effecting the cast.

The principal object of the invention is the provision of a bobber so formed as to permit it and its associated tackle to be cast and including a means for effectively carrying the tackle thereon.

A further object of the invention is the provision of a bobber incorporating means for positioning the bobber on the fishing line which means is operative by simply moving the line through a portion of the bobber.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawing, wherein:

Figure 1 is a side elevation with parts broken away showing the fishline bobber and the tackle associated therewith showing the same in casting position or in the position resulting from the bobber's first touching the water into which it is cast.

Figure 2 is a front end elevation of the left end of the bobber shown in Figure 1, the dotted lines thereon indicating the action of the tackle associated therewith in its unwinding action during which time the bobber rocks from side to side until the amount of line carried by the bobber has been completely unwound.

Figure 3 shows the fishline bobber in fishing position, it having moved into erect position after the tackle has completely unwound therefrom.

By referring to the drawing and Figure 1 in particular it will be seen that the fishline bobber comprises a longitudinally elongated body portion 10 preferably formed of wood or some other buoyant material and, in practice, painted or otherwise coated with waterproof material. It will be observed that an eyelet 11 has been affixed to the body 10 at one end thereof and that the other end thereof is provided with a tapering sleeve-like projection 12 having an opening 13 at its extreme outer end and a secondary opening 14 adjacent the body portion 10. A captive ball 15 is positioned within this tapering sleeve portion 12 and is of a size prohibiting it from emerging through the openings 13 or 14. This tapering sleeve and ball structure is used as a means of providing a convenient and practical way of positioning the bobber on the fishline and which will enable the relative position of the bobber on the fishline to be readily changed as for instance when various depths of water are encountered in fishing.

By referring to Figures 1 and 2 of the drawing it will be seen that a pair of oppositely disposed arms 16 are positioned on the bobber midway between the ends thereof and are adapted to receive the fishline which in practice is wound back and forth over and between these arms. In order that the weight commonly associated with the dependent portion of the fishing tackle may be affixed to the bobber during the casting period, a downwardly depending hook 17 is provided for the reception of the weight and is so formed that the weight will readily slide therefrom when the bobber strikes the water. Still referring to Figures 1 and 2 it will be seen that a fishline 18 has been passed through the eyelet 11 and then passed through the tapering sleeve 12 by means of openings 14 and 13 at the opposite end of the bobber, the ball 15 serving to firmly grasp the line 18 in any desired position. After the line 18 emerges from the opening 13 at the end of the tapering sleeve 12 it is wound back and forth as shown in Figures 1 and 2 in the drawing alternately over each of the arms 16 and on one side of the hook 17 so that the hook 17 will not interfere with the unwrapping of the line 18 from the bobber. A weight 19 and a fish hook 20 of the depending fishing assembly are carried on the hook 17 as shown in Figure 1 and by referring to Figure 2 it will be seen that when the bobber strikes the water a sidewise rocking motion results when the weight 19 slips off the hook 17 and drops downwardly through the water thus alternately pulling downwardly the arm 16 until the line 18 slides therefrom thus effectively unwinding the line carried on the bobber. When all of the line on the bobber which was of a predetermined length according to the depth of the water in which the fish hook is suspended has unwound, the bobber assumes an upright position as shown in Figure 3 due to the weight's suspension from the tapering sleeve 12 thereof where the line 18 is effectively held by reason of the ball 15 wedging against the same.

When a fish has been caught on the tackle associated with the bobber it may be reeled in the complete length of the line as the fishline 18 slides easily through the eyelet 11 and the sleeve 12 as the ball 15 therein releases its hold on the line and permits the line to pass the bobber thus enabling the fish to be reeled in the full length of the fishing line. When the fish has been removed from the hook the line is again set at its predetermined fishing depth in relation to the bobber and rewound thereupon and cast again.

It will thus be seen that a practical and efficient casting bobber has been shown and described which makes possible and practical the casting of a fishing bobber and dependent fishing tackle a considerable distance from the shore which is often desirable in fishing in various streams and lakes. It will further be seen that the casting bobber, by reason of the oppositely disposed arms 16, provides a practical means of carrying the dependent fishing tackle including the weight and the fish hook in a non-fouling manner and that as a result thereof the dependent fishing tackle reaches the extent of the cast in perfect condition and through the action above described automatically assumes its dependent position beneath the bobber.

It will also be seen that the bobber may be simply and economically formed and further that there are no expensive or complicated parts upon which the bobber is dependent in its action and that the various portions of the bobber form a convenient means for winding the fishing line thereon at such times as the bobber and fishline is not in use.

What I claim is:

1. A fishing bobber having means formed at one end for attaching a casting line thereto and means formed on its other end for holding the line in predetermined relation thereto, means for winding the fishline on the said bobber, said means comprising a pair of oppositely disposed arms, and a hook positioned on the said bobber midway between the said arms and adapted to receive a weight thereon, said weight being attached to said casting line.

2. A casting bobber having a casting line attached thereto, said line having a weight attached to its outer end, said bobber having a pair of oppositely disposed arms spaced radially of the said bobber for receiving the said line and a hook positioned on the said bobber midway between the said arms for the reception of the said weight so that the line may be wound on the said arms and remain in position until the said bobber strikes the water at which time the said weight will slide off the said hook and cause the line to unwind from the radially spaced arms of the said bobber.

ALBERT S. JOHNSON.